US012651185B2

(12) United States Patent
Li et al.

(10) Patent No.: US 12,651,185 B2
(45) Date of Patent: Jun. 9, 2026

(54) SIGNAL CONTROL SYSTEM AND METHOD FOR QUANTUM COMPUTING, AND WAVEFORM CALIBRATION CIRCUIT

(71) Applicants:Shenzhen Tencent Computer Systems Company Limited, Shenzhen (CN); INSTITUTE OF SOFTWARE CHINESE ACADEMY OF SCIENCES, Beijing (CN)

(72) Inventors: Riling Li, Shenzhen (CN); Mengyu Zhang, Shenzhen (CN); Zhenxing Zhang, Shenzhen (CN); Shenggang Ying, Shenzhen (CN); Shengyu Zhang, Shenzhen (CN)

(73) Assignees: SHENZHEN TENCENT COMPUTER SYSTEMS COMPANY LIMITED, Shenzhen (CN); INSTITUTE OF SOFTWARE CHINESE ACADEMY OF SCIENCES, Beijing (CN)

( * ) Notice: Subject to any disclaimer, the term of this patent is extended or adjusted under 35 U.S.C. 154(b) by 683 days.

(21) Appl. No.: 18/071,479

(22) Filed: Nov. 29, 2022

(65) Prior Publication Data

US 2023/0196168 A1     Jun. 22, 2023

Related U.S. Application Data

(63) Continuation of application No. PCT/CN2021/132801, filed on Nov. 24, 2021.

(30) Foreign Application Priority Data

Aug. 26, 2021     (CN) .......................... 202110988046.9

(51) Int. Cl.
*H03H 17/00*     (2006.01)
*G06F 1/02*     (2006.01)
(Continued)

(52) U.S. Cl.
CPC .................................... *G06N 10/40* (2022.01)

(58) Field of Classification Search
CPC ........ G06N 10/40; G06N 10/20; G06N 10/00; Y02P 90/02; G06F 1/0321; G06F 1/022;
(Continued)

(56) References Cited

U.S. PATENT DOCUMENTS

| | | | |
|---|---|---|---|
| 5,805,479 A | 9/1998 | Tang | |
| 2006/0218213 A1 | 9/2006 | Shehata et al. | |

(Continued)

FOREIGN PATENT DOCUMENTS

| | | |
|---|---|---|
| CN | 103018701 A | 4/2013 |
| CN | 113011591 A | 6/2021 |
| JP | 2002290210 A | 10/2002 |

OTHER PUBLICATIONS

Rol et al., (Time-domain characterization and correction of on-chip distortion of control pulses in a quantum processor, Feb. 28, 2020, pp. 1-13). (Year: 2020).*

(Continued)

*Primary Examiner* — Nghia M Doan
(74) *Attorney, Agent, or Firm* — Morgan, Lewis & Bockius LLP

(57) ABSTRACT

A signal control system for quantum computing includes a signal source, a waveform calibration circuit, a qubit control line, and a qubit module. The signal source is configured to generate an original control signal. The waveform calibration circuit includes at least one IIR digital filter. The IIR digital filter is configured to perform waveform calibration on the original control signal to obtain a calibrated control signal. The qubit control line is configured to guide the calibrated control signal to the qubit module. The qubit module is configured to generate a qubit. The calibrated (Continued)

control signal acts on the qubit after passing through the qubit control line, so as to control the qubit.

17 Claims, 5 Drawing Sheets

(51) Int. Cl.
*G06N 10/00* (2022.01)
*G06N 10/40* (2022.01)

(58) Field of Classification Search
CPC ........ H03K 3/38; H03K 5/1252; H03H 17/04; H03H 17/0201; H03H 2017/009
See application file for complete search history.

(56) References Cited

U.S. PATENT DOCUMENTS

| | | | |
|---|---|---|---|
| 2013/0142359 A1* | 6/2013 | Murata | H03G 5/005 |
| | | | 381/98 |
| 2013/0148230 A1* | 6/2013 | Jin | G11B 5/6076 |
| | | | 360/55 |
| 2019/0049495 A1 | 2/2019 | Ofek et al. | |
| 2020/0034736 A1* | 1/2020 | Mueller | G06F 1/022 |
| 2020/0394524 A1 | 12/2020 | Vainsencher et al. | |
| 2023/0170916 A1* | 6/2023 | Van Oven | G06F 9/44521 |
| | | | 713/100 |

OTHER PUBLICATIONS

Tencent Technology (Shenzhen) Company Limited, Extended European Search Report, EP21937197.8, Sep. 21, 2023, 14 pgs.

Rol et al., "Time-Domain Characterization and Correction of On-Chip Distortion of Control Pulses in Quantum Processor", Applied Physics Letters, vol. 116, No. 5, Feb. 3, 2020, 5 pgs., https://pubs.aip/article/116/5/054001/38884.

Yang et al., "An FPGA-Based Low Latency AWG for Superconducting Quantum Computers" 2021 IEEE International Instrumentation and Measurement Technology Conference, May 2021, 6 pgs., https://ieeexplore.ieee.org/document/9460084.

Tencent Technology, ISR, PCT/CN2021/132801, May 6, 2022, 2 pgs.

Tencent Technology, WO, PCT/CN2021/132801, May 6, 2022, 4 pgs.

Tencent Technology, IPRP, PCT/CN2021/132801, Feb. 27, 2024, 5 pgs.

* cited by examiner (a)

(b)

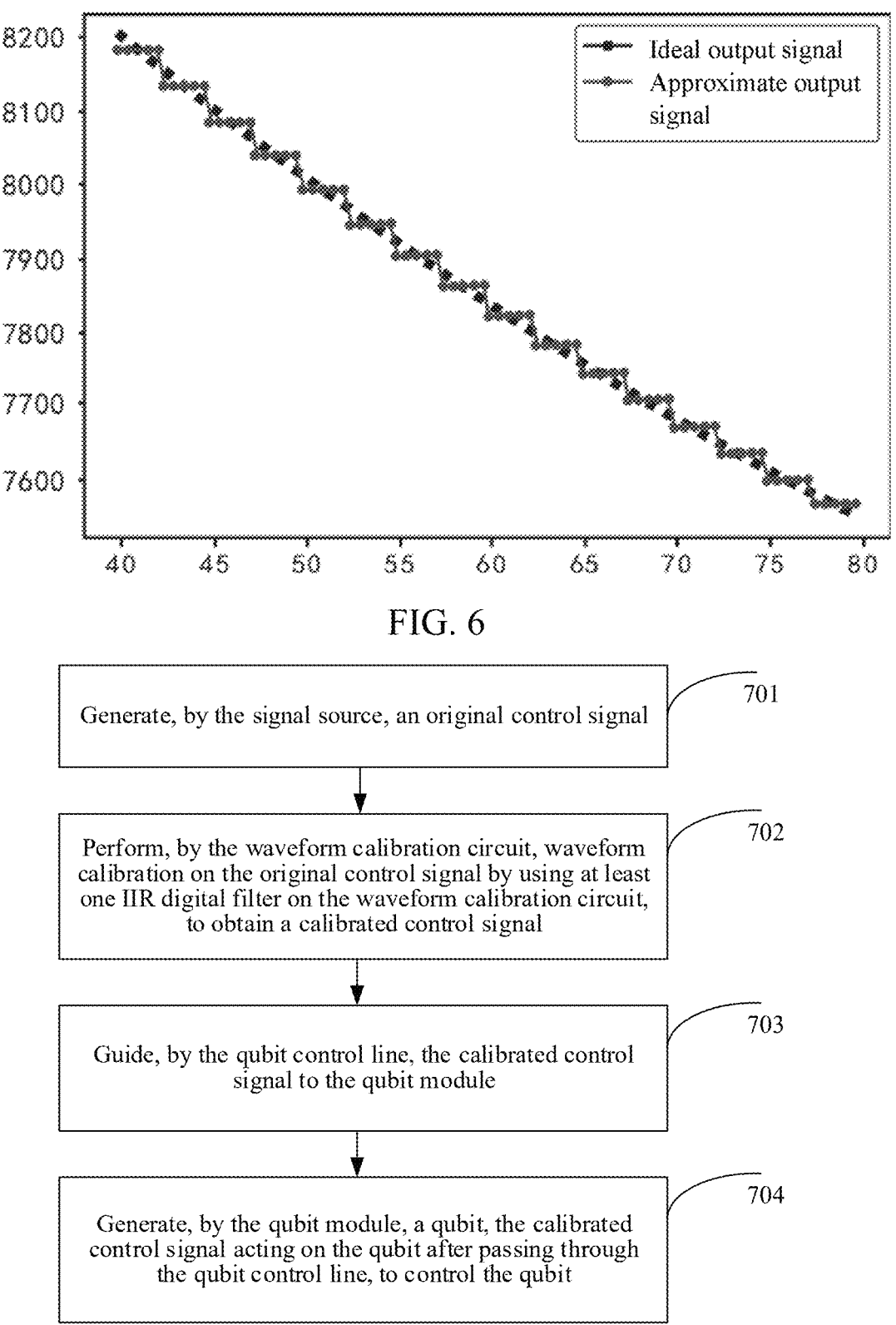

FIG. 6

Generate, by the signal source, an original control signal — 701

Perform, by the waveform calibration circuit, waveform calibration on the original control signal by using at least one IIR digital filter on the waveform calibration circuit, to obtain a calibrated control signal — 702

Guide, by the qubit control line, the calibrated control signal to the qubit module — 703

Generate, by the qubit module, a qubit, the calibrated control signal acting on the qubit after passing through the qubit control line, to control the qubit — 704

FIG. 7

SIGNAL CONTROL SYSTEM AND METHOD FOR QUANTUM COMPUTING, AND WAVEFORM CALIBRATION CIRCUIT

CROSS-REFERENCE TO RELATED APPLICATIONS

This application is a continuation application of PCT Patent Application No. PCT/CN2021/132801, entitled "SIGNAL CONTROL SYSTEM, CONTROL METHOD AMD WAVEFORM CALIBRATION CIRCUIT FOR QUANTUM COMPUTING" filed on Nov. 24, 2021, which claims priority to Chinese Patent Application No. 202110988046.9, filed with the State Intellectual Property Office of the People's Republic of China on Aug. 26, 2021, and entitled "QUBIT CONTROL SYSTEM AND WAVEFORM CALIBRATION CIRCUIT", all of which are incorporated herein by reference in their entirety.

FIELD OF THE TECHNOLOGY

The embodiments of this application relate to the fields of computer technologies and digital signal processing technologies, and in particular, to a signal control system and method for quantum computing, and a waveform calibration circuit.

BACKGROUND OF THE DISCLOSURE

Waveform calibration refers to the calibration of distorted waveforms, so that a desired waveform is output or applied to a target.

In the field of quantum technology, in view of the waveform distortion problem on a qubit control line, a calibrated waveform is pre-calculated in a host computer such as a high-level personal computer (PC) or server. The calibrated waveform is then transmitted to an arbitrary waveform generator (AWG) through a network, and the AWG generates a corresponding pulse signal according to the calibrated waveform to regulate a qubit.

However, this method requires operations such as process invocation of the host computer and data transmission through the host computer, leading to high communication delays. As a result, application requirements of low delay cannot be met.

SUMMARY

Various embodiments of this application provide a signal control system and method for quantum computing, and a waveform calibration circuit. The technical solutions are as follows:

According to an aspect of the embodiments of this application, a signal control system for quantum computing is provided, including: a signal source, a waveform calibration circuit, a qubit control line, and a qubit module, wherein the signal source is configured to generate an original control signal;

the waveform calibration circuit includes at least one infinite impulse response (IIR) digital filter, and the IIR digital filter is configured to perform waveform calibration on the original control signal to obtain a calibrated control signal;

the qubit control line is configured to guide the calibrated control signal to the qubit module;

the qubit module is configured to generate a qubit; and the calibrated control signal acts the qubit after passing through the qubit control line, so as to control the qubit.

According to an aspect of the embodiments of this application, a waveform calibration circuit is provided. The circuit includes at least one IIR digital filter, the IIR digital filter is configured to perform waveform calibration on an input signal to obtain an output signal, the output signal is calculated according to the input signal and a state value, the state value is updated every other group of sampling points, and each group of sampling points including a plurality of sampling points.

According to an aspect of the embodiments of this application, a signal control method for quantum computing is provided, applicable to a signal control system for quantum computing, the signal control system including: a signal source, a waveform calibration circuit, a qubit control line, and a qubit module, and the method includes:

generating, by the signal source, an original control signal;

performing, by the waveform calibration circuit by using at least one IIR digital filter on the waveform calibration circuit, waveform calibration on the original control signal to obtain a calibrated control signal;

guiding, by the qubit control line, the calibrated control signal to the qubit module; and generating, by the qubit module, a qubit, the calibrated control signal acting on the qubit after passing through the qubit control line, to control the qubit.

According to an aspect of the embodiments of this application, a non-transitory computer-readable storage medium is provided. The storage medium stores at least one instruction, at least one program, a code set, or an instruction set, the at least one instruction, the at least one program, the code set, or the instruction set is loaded and executed by a processor to implement the foregoing signal control method for quantum computing.

According to an aspect of the embodiments of this application, a computer program product or a computer program is provided, the computer program product or the computer program including computer instructions, the computer instructions is stored in a computer-readable storage medium. A processor of a computer device reads the computer instructions from the computer-readable storage medium and executes the computer instructions to cause the computer device to perform the foregoing signal control method for quantum computing.

Through the IIR digital filter on the waveform calibration circuit, the control signal of the qubit is pre-compensated and calibrated, so that after the calibrated control signal passes through the qubit control line, the final control signal acting on the qubit is accurate and in line with the expected control signal, to implement precise control of the qubit. In addition, in this application, waveform calibration is performed on the control signal by the IIR digital filter on the hardware circuit, that is, the waveform calibration circuit. Compared with the waveform calibration implemented by the host computer, the communication delay brought by the operations such as process invocation of the host computer and data transmission can be avoided, thereby reducing the time required for waveform calibration and meeting the application requirements of low delay.

BRIEF DESCRIPTION OF THE DRAWINGS

FIG. 6 is a schematic exemplary diagram of local representation of data when an IIR digital filter performs a simulation experiment.

FIG. 7 is a flowchart of a signal control method for quantum computing according to an embodiment of this application.

DESCRIPTION OF EMBODIMENTS

Figure 1:
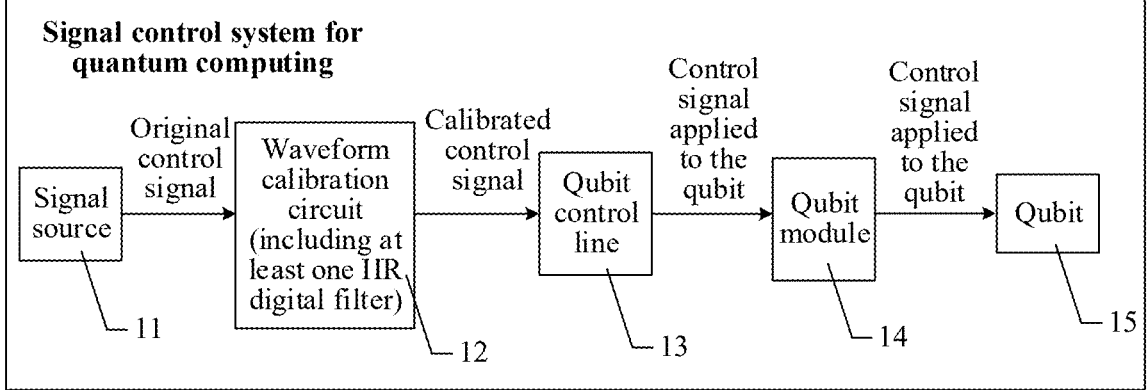
FIG. 1 is a schematic diagram of a signal control system for quantum computing according to an embodiment of this application.

Some key terms involved in this application are explained below.

1. Quantum computation (QC): QC is a scheme of using superposition and entanglement properties of quantum states to rapidly complete a specific computation task.
2. Superconducting quantum computing (SQC): SQC is a technical route of implementing quantum computing with Josephson Junction (JJ) based on the superconducting technology.
3. Quantum bit (qubit): Qubit is a basic information storage and processing unit of a quantum computer. Quantum computing is actually the manipulation of qubits. For superconducting quantum computing, qubits work in an ultra-low temperature environment, and the manipulation is achieved by applying a pulse signal.
4. Field programmable gate array (FPGA): FPGA is a product further developed based on programmable logic devices such as programmable array logic (PAL), generic array logic (GAL), and a complex programmable logic device (CPLD). The FPGA emerged as a semi-custom circuit in the field of application specific integrated circuits (ASICs), which not only resolves the shortcomings of custom circuits, but also overcomes the shortcomings of the limited quantity of original programmable device gate circuits. The FPGA may be programmed using the hardware programming language Verilog HDL or very-high-speed integrated circuit hardware description language (VHDL).
5. Verilog HDL: It is a hardware description language (HDL), referred to as Verilog, which is a language that describes the structure and behavior of digital system hardware in textual form, and may be used to represent logical circuit diagrams, logical expressions, and logical functions completed by digital logic systems.
6. Digital filter: It is an algorithm or apparatus formed by digital multipliers, adders, and delay units. The function of the digital filter is to perform arithmetic processing on digital code of an inputted discrete signal to change the signal spectrum.
7. Analog filter: It is a circuit and device that can filter analog or continuous time signals.
8. Finite impulse response digital filter (FIR DF): It is a type of digital filter whose unit impulse response h(n) only contains a finite quantity of non-zero samples, abbreviated as FIR, and whose general implementation is a non-recursive structure, and is thus also referred to as a non-recursive digital filter. A typical relationship between an input x[n] signal and an output signal y[n] thereof is: $y[n]=h[0]\times[n]+h[1]\times[n-1]+ \ldots +h[N]\times[n-N]$ where N is a unit impulse response length of the digital filter.

9. Infinite impulse response digital filter (IIR DF): Corresponding to the FIR, an infinite impulse response digital filter is a digital filter whose response to an input signal h of unit impulse is an infinite sequence, abbreviated as IIR. The characteristic of the IIR filter is that an output y[n] thereof is jointly determined by the current and past input signal x[n] and the past output signal. Generally, a mathematical relationship thereof is: $y[n]=b[0]\times[n]+b[1]\times[n-1]+ \ldots +b[N]\times[n-N]-a[1]y[n-1]-a[2]y[n-2]- \ldots -a[M]y[n-M]$. As can be seen, the past output signal $y[n-1], \ldots , y[n-M]$ participates in the operation. The Chinese name of the "IIR digital filter" in the embodiments of this application is "infinite impulse response digital filter".
10. Z channel: In a superconducting quantum computing device, there are many channels for manipulating physical qubits, including: XY channel, Z channel, reading channel, etc. The purpose of the Z channel is to rapidly and briefly change a frequency of a qubit through a pulse signal, which is used frequently in quantum computing tasks.
11. Real-time feedback control: Real-time feedback control is a necessary function in future programmable quantum computers. Real-time feedback control requires that in a quantum computing task, the classical data register can receive measurement results of some qubits in real time, and values of some classical registers may be used to determine the next operation corresponding to the qubit. In the whole computing process, quantum data and classical data are interactive.
12. Pulse distortion: Due to the impact from components in the external room temperature environment (for example, the bandwidth of waveform generation, and the high-pass filter of the biaser), the internal components of the dilution refrigerator (low-pass filters, impedance detuning, and skin effect of coaxial cables), and signal traces on quantum chips, the real pulse waveform acting on the qubit is distorted to a certain extent compared to the original input pulse waveform. In this case, the pulse distortion needs to be calibrated to ensure the accuracy of qubit manipulation.
13. Qubit control line: It is used to control the qubit, for example, a control signal for controlling the qubit is transmitted through the qubit control line. The qubit control lines may include microwave control lines (also referred to as XY lines) and DC bias lines (also referred to as Z lines). The microwave control lines are used to drive qubits to jump between different energy levels. The DC bias lines are used to tune the frequency of the qubits. The qubit control lines in the embodiments of this application include at least a DC bias line.

FIG. 1 is a schematic diagram of a signal control system for quantum computing according to an embodiment of this application. The signal control system may include: a signal source 11, a waveform calibration circuit 12, a qubit control line 13, and a qubit module 14.

The signal source 11 is configured to generate an original control signal.

The waveform calibration circuit 12 includes at least one IIR digital filter, and the IIR digital filter is configured to perform waveform calibration on the original control signal to obtain a calibrated control signal.

The qubit control line 13 is configured to guide the calibrated control signal to the qubit module 14.

The qubit module 14 is configured to generate a qubit 15.

The calibrated control signal acts on the qubit 15 after passing through the qubit control line 13, to control the qubit 15.

The original control signal refers to a signal generated by the signal source 11 for controlling the qubit 15. For example, the original control signal may be a pulse signal for adjusting the frequency of the qubit 15. The form of the original control signal is not limited in this embodiment of this application. For example, the original control signal may be a signal in the form of light, electricity, magnetism, sound, or the like. For example, when the form of the original control signal is light, the signal source 11 is configured to generate a light pulse signal, to control the qubit 15. When the original control signal is in the form of electricity, the signal source 11 is configured to generate an electrical pulse signal to control the qubit 15.

The qubit control line 13 is configured to control the qubit 15. For example, the qubit control line 13 may adjust the frequency of the qubit 15 generated by the qubit module 14 by guiding a pulse signal to the qubit module 14. In some embodiments, the qubit control line 13 may also have different forms. For example, the qubit control line 13 may be in a qualitative form, such as a control line (for example, an optical fiber) for guiding an optical pulse signal, or a control line (for example, an electrical signal wire) for guiding an electrical pulse signal. The qubit control line 13 may be alternatively in a massless form, such as a channel for guiding a magnetic signal or a channel for guiding an acoustic signal, which is not limited in this embodiment of this application. "Guiding" in the embodiments of this application may be understood as transmission or propagation, for example, transmission or propagation in a qubit control line (for example, an optical fiber or an electrical signal wire) in the qualitative form, or transmission or propagation in a qubit control line (for example, a channel) in the massless form.

The qubit module 14 is configured to generate qubits. For example, the qubit module 14 may generate qubits in any particle form, such as photons or electrons.

Due to the impact from components in the external room temperature environment (for example, the bandwidth of waveform generation, and/or the high-pass filter of the biaser), the internal components of the dilution refrigerator (e.g., low-pass filters, impedance detuning, and/or skin effect of coaxial cables), and signal traces on quantum chips, the real pulse waveform acting on the qubit 15 is distorted to a certain extent compared to the original input pulse waveform (that is, the "original control signal"). In this case, the pulse distortion needs to be calibrated to ensure the accuracy of qubit manipulation. In this application, terms such as pulse distortion, waveform distortion, pulse waveform distortion, nonlinear distortion, and nonlinear distortion are different expressions expressing the same meaning, but a person skilled in the art can understand the meanings.

In other words, if the original control signal generated by the signal source 11 is directly applied to the qubit 15 through the qubit control line 13, due to the LRC devices (inductors, resistors, and capacitors) on the qubit control line 13 and some other reasons, the waveform corresponding to the original control signal is distorted. As a result, the control signal actually acting on the qubit 15 is different from the original control signal. Therefore, it is necessary to perform waveform calibration on the original control signal generated by the signal source 11 through pre-compensation (or pre-calibration), to obtain a calibrated control signal. The calibrated control signal passes through the qubit control line 13 and acts on the qubit 15, so that the final control signal acting on the qubit 15 is accurate and in line with the expected control signal. For example, the final control signal acting on the qubit 15 is the same as the original control signal as much as possible, to implement precise control of the qubit 15.

In the embodiments of this application, the waveform calibration of the original control signal is implemented by the waveform calibration circuit 12. Specifically, the waveform calibration circuit 12 includes at least one IIR digital filter, and waveform calibration is performed on the original control signal through the at least one IIR digital filter to obtain a calibrated control signal. The quantity of the IIR digital filters may be set according to the actual situation, which is not limited in this application.

For example, when only one IIR digital filter is used for waveform calibration, the input signal of the IIR digital filter is the original control signal, and the output signal is the calibrated control signal.

In another example, when a plurality of IIR digital filters are used to achieve waveform calibration, the plurality of IIR digital filters may adopt a series structure, a parallel structure, a series-parallel hybrid structure, or the like. Through the processing of the plurality of IIR digital filters, the original control signal is finally converted into the calibrated control signal.

Taking a series structure of N IIR digital filters as an example, where N is an integer greater than 1, the N IIR digital filters are connected in series in sequence. An input signal of the first IIR digital filter is an original control signal, and the original control signal is filter by the first IIR digital filter to obtain an output signal of the first IIR digital filter. The output signal of the first IIR digital filter is an input signal of the second IIR digital filter, and the input signal of the second IIR digital filter is filtered by the second IIR digital filter to obtain an output signal of the second IIR digital filter. By analogy, an output signal of an $(N-1)^{th}$ IIR digital filter is an input signal of an $N^{th}$ IIR digital filter, the input signal of the $N^{th}$ IIR digital filter is filtered by the $N^{th}$ IIR digital filter to obtain an output signal of the $N^{th}$ IIR digital filter, and the output signal of the $N^{th}$ IIR digital filter is a calibrated control signal.

In an example, a series structure of four IIR digital filters are used to calibrate the waveform distortion of the Z channel. The signal source 11 generates an original control signal, and the original control signal is used to adjust the frequency of the qubit 15. The waveform calibration circuit 12 includes four IIR digital filters connected in series. An input signal of the first IIR digital filter is an original control signal, and the original control signal is filter by the first IIR digital filter to obtain an output signal of the first IIR digital filter. The output signal of the first IIR digital filter is an input signal of the second IIR digital filter, and the input signal of the second IIR digital filter is filtered by the second IIR digital filter to obtain an output signal of the second IIR digital filter. The output signal of the second IIR digital filter is an input signal of the third IIR digital filter, and the input signal of the third IIR digital filter is filtered by the third IIR digital filter to obtain an output signal of the third IIR digital filter. An output signal of the third IIR digital filter is an input signal of the fourth IIR digital filter. The input signal of the fourth IIR digital filter is filtered by the fourth IIR digital filter to obtain an output signal of the fourth IIR digital filter, and the output signal of the fourth IIR digital filter is a calibrated control signal. Afterwards, the calibrated control signal acts on the qubit 15 through the qubit control line 13 (optionally set as a Z line or a DC bias line), to adjust the frequency of the qubit 15.

In some embodiments, the waveform calibration circuit 12 is an FPGA. Since the FPGA has the characteristics of low delay, a waveform calibration system is directly implemented on the FPGA, which can reduce the time required for waveform calibration and the achieve the effect of low delay. Through experiments, it is found that the waveform calibration circuit 12 is implemented by an FPGA, and the delay can be controlled within 40 ns, which meets the delay requirements for controlling qubits, and lays the foundation for the classical-quantum hybrid computing architecture with real-time feedback. Specifically, in a real-time classical-quantum interaction system, a future input signal is uncertain (may be determined by measurement results of some qubits at present). In this case, the IIR digital filter has high requirements for low delay. The IIR digital filter is implemented on the FPGA, which can meet the requirements of the quantum interactive system for low delay.

In some embodiments, the FPGA has eight channels, and each of the channels includes up to four IIR digital filters. Therefore, a single FPGA can accommodate up to 8×4=32 IIR digital filters. Assuming that a series structure of four IIR digital filters is used to calibrate the waveform distortion of the Z-channel, that is, four IIR digital filters are required for one qubit, a single FPGA can meet the use requirements of eight qubits and realize real-time (with a delay of only a few tens of ns) and high-channel-density (a plurality of filters in a single FPGA) calibration of waveform distortion.

Certainly, in some other embodiments, the waveform calibration circuit 12 may alternatively adopt other hardware integration methods in the ASIC field, such as CPLD or dedicated custom chips, as long as the low delay requirements can be met, which is not limited in this application.

According to the technical solutions provided in the embodiments of this application, through the IIR digital filter on the waveform calibration circuit, the control signal of the qubit is pre-compensated and calibrated, so that after the calibrated control signal passes through the qubit control line, the final control signal acting on the qubit is accurate and in line with the expected control signal, to implement precise control of the qubit. In addition, in this application, waveform calibration is performed on the control signal by the IIR digital filter on the hardware circuit, that is, the waveform calibration circuit. Compared with the waveform calibration implemented by the host computer, the communication delay brought by the operations such as process invocation of the host computer and data transmission can be avoided, thereby reducing the time required for waveform calibration and meeting the application requirements of low delay.

In some embodiments, for each IIR digital filter on the waveform calibration circuit 12, the IIR digital filter is configured to calculate an output signal thereof according to an input signal and a state value thereof. The input signal of the IIR digital filter may be an original control signal, or may be an output signal of one or more IIR digital filters connected thereto. For details, reference may be made to the descriptions in the foregoing embodiment, which is not repeated herein. The filtering process of the IIR digital filter may be as follows: According to a specific sampling frequency, a series of data points (referred to as "sampling points" in this application) are sampled from the input signal, and for each sampling point, a value of the output signal corresponding to the sampling point is calculated according to a value of the input signal corresponding to the sampling point and the state value of the IIR digital filter.

In principle, the state value of the IIR digital filter is also to be updated with the sampling points. That is, for each sampling point, a value of the output signal corresponding to the sampling point is calculated according to a value of the input signal corresponding to the sampling point and a state value corresponding to the sampling point. However, to shorten the time required for waveform calibration, output signals corresponding to a plurality of sampling points need to be calculated simultaneously for each beat (one beat is 10 ns) on the waveform calibration circuit 12 (for example, the FPGA). Since the state value of the IIR digital filter is iteratively updated with the sampling points, that is, a state value corresponding to the current sampling point needs to be calculated based on a state value corresponding to the previous sampling point, the state value cannot be calculated in parallel based on a plurality of sampling points simultaneously. If the state value is updated with the sampling points, the output signals corresponding to the plurality of sampling points cannot be calculated for each beat simultaneously. In an example where output signals corresponding to 20 sampling points need to be calculated simultaneously for each beat, if the state value is updated with the sampling points, 20 operations need to be performed in sequence, and the state value corresponding to each sampling point is calculated. The time required for this calculation process is far more than 10 ns.

In this embodiment of this application, to overcome the foregoing problem, and calculate the output signals corresponding to the plurality of sampling points simultaneously for each beat, the state value of the IIR digital filter is updated every other group of sampling points, and each group of sampling points includes a plurality of sampling points. That is, a plurality of sampling points included in the same group of sampling points correspond to the same state value, and the same value is used to approximately represent the state value of the plurality of consecutive sampling points. Obviously, compared with the method of updating the state value with each sampling point, the method of updating the state value by group greatly reduces the quantity of calculation times of the state value and fully reduces the processing time of the IIR digital filter. In this way, the output signals corresponding to the plurality of sampling points can be calculated simultaneously for each beat.

In some embodiments, each group of sampling points may include the same quantity or different quantities of sampling points. To simplify the operation process, each group of sampling points includes the same quantity of sampling points, each group of sampling points includes k sampling points, and k is an integer greater than 1. The value of k has a negative correlation with a calculation time of the IIR digital filter, and has a negative correlation with the accuracy of the IIR digital filter. That is, a larger value of k indicates more sampling points using the same state value, which reduces the quantity of times for calculating the state value and reduces the calculation time of the IIR digital filter, but also reduces the accuracy of the IIR digital filter. Conversely, a smaller value of k indicates a smaller quantity of sampling points using the same state value, which helps to improve the accuracy of the IIR digital filter, but also increases the quantity of times for calculating the state value, increasing the calculation time of the IIR digital filter. Therefore, during designing of the IIR digital filter, it is necessary to comprehensively consider the requirements of calculation time and accuracy, to finally select an appropriate value of k.

In some embodiments, the value range of k is [5, 10], that is, each group of sampling points includes five to ten sampling points. For example, for the application requirements of waveform distortion calibration of the Z-channel, it is found through experiments that when each group of sampling points includes ten sampling points, the requirements of accuracy and real-time performance can be met. Certainly, if the accuracy needs to be improved in some scenarios, the value of k can be appropriately reduced, for example, each group of sampling points includes five sampling points, which is not limited in this application. In this embodiment of this application, the value range of k is set to [5, 10], so that the IIR digital filter can be applied to a scenario of waveform calibration of the control signal of the qubit, and the accuracy and real-time requirements corresponding to the waveform calibration scenario can be met. The experimental data respectively corresponding to cases in which each group of sampling points includes ten sampling points and five sampling points is given below:

In some embodiments, for each IIR digital filter on the waveform calibration circuit 12, the IIR digital filter is configured to calculate an output signal thereof by performing weighted addition on an input signal and a state value thereof. The weight coefficients respectively corresponding to the input signal and the state value may be preset.

In some embodiments, the IIR digital filter calculates an output signal corresponding to a sampling point in the following manner: calculating, according to an average of input signals respectively corresponding to sampling points in an $i^{th}$ group of sampling points and a state value corresponding to an $(i-1)^{th}$ group of sampling points, a state value corresponding to the $i^{th}$ group of sampling points, i is a positive integer; and calculating, for each sampling point in the $i^{th}$ group of sampling points, an output signal corresponding to the sampling point according to an input signal corresponding to the sampling point and the state value corresponding to the $i^{th}$ group of sampling points. In some embodiments, after the average of the input signals respectively corresponding to the sampling points in the $i^{th}$ group of sampling points is calculated, weighted addition is performed on the average and the state value corresponding to the $(i-1)^{th}$ group of sampling points, to obtain the state value corresponding to the $i^{th}$ group of sampling points. Afterwards, for each sampling point in the $i^{th}$ group of sampling points, an output signal corresponding to the sampling point is calculated by performing weighted addition on an input signal corresponding to the sampling point and the state value corresponding to the $i^{th}$ group of sampling points. According to the foregoing description, a plurality of sampling points in the same group of sampling points share the same approximate state value, thereby reducing the quantity of times for updating the state value and reducing the calculation time. In addition, when the output signals corresponding to the plurality of sampling points in the $i^{th}$ group of sampling points, the output signals of the plurality of sampling points may be calculated simultaneously (or referred to as in parallel), thereby reducing the calculation time of the output signals.

In some embodiments, the calculation process of the IIR digital filter adopts the pipeline technology to improve the parallelism and further reduce the calculation time. The pipeline technology is a quasi-parallel processing implementation technology in which operations belonging to different parts during an operation task overlap and operate.

Figure 2:
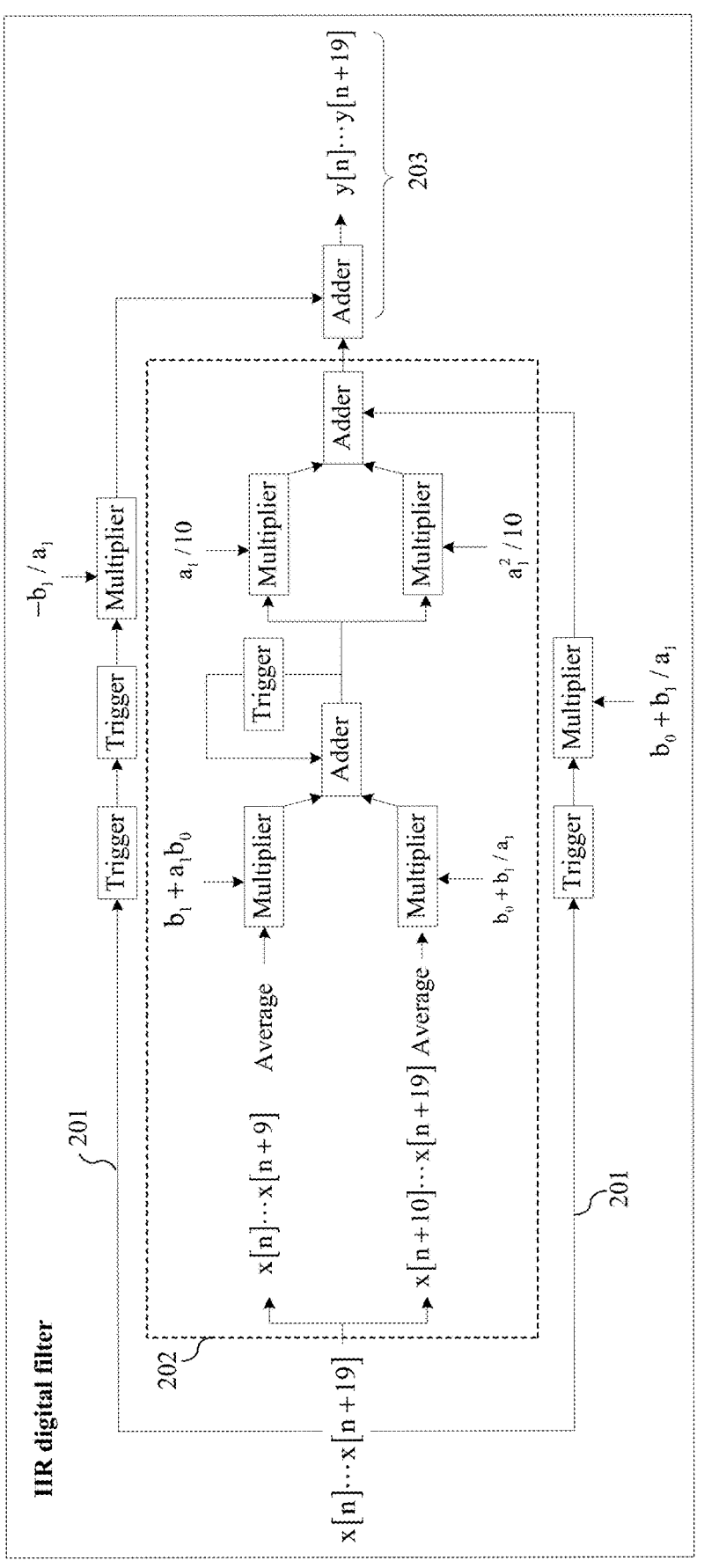
FIG. 2 is a schematic diagram of an IIR filter according to an embodiment of this application.

In some embodiments, the IIR digital filter is implemented by using three stages of pipelines, which include a first-stage pipeline 201, a second-stage pipeline 202, and a third-stage pipeline 203, as shown in FIG. 2. The first-stage pipeline 201 is configured to perform preliminary processing on the input signals respectively corresponding to the sampling points in the $i^{th}$ group of sampling points, to prepare for average calculation and state value calculation in the next stage of pipeline. For example, the first-stage pipeline 201 is configured to calculate a sum of the input signals respectively corresponding to the sampling points in the $i^{th}$ group of sampling points. The second-stage pipeline 202 is configured to calculate the average of the input signals respectively corresponding to the sampling points in the $i^{th}$ group of sampling points according to a processing result of the first-stage pipeline 201, and calculate the state value corresponding to the $i^{th}$ group of sampling points. For example, the second-stage pipeline 202 is configured to calculate the average of the input signals respectively corresponding to the sampling points in the $i^{th}$ group of sampling points according to the sum of the input signals respectively corresponding to the sampling points in the $i^{th}$ group of sampling points, and calculate the state value corresponding to the $i^{th}$ group of sampling points according to the average of the input signals respectively corresponding to the sampling points in the $i^{th}$ group of sampling points and the state value corresponding to the $(i-1)^{th}$ group of sampling points. The third-stage pipeline 203 is configured to calculate, for each sampling point in the $i^{th}$ group of sampling points, an output signal corresponding to the sampling point according to an input signal corresponding to the sampling point and the state value corresponding to the $i^{th}$ group of sampling points. The calculation time of each stage of pipeline is about one beat (ten ns). If the pipeline technology is not used, the quantity of beats consumed in each round of calculation is at least three beats (30 ns). Through the implementation of the pipelines, one round of calculation can be achieved for each beat, which further reduces the delay of the IIR digital filter.

The implementation and derivation process of the technical solution of this application is described below.

To calibrate the pulse waveform distortion caused by a single RLC device, a step response function that needs to be implemented is as follows:

$$y(t) = g\left(1 + Ae^{-\frac{t}{\tau}}\right)u(t),$$

where
the function is a continuous function, which corresponds to an analog filter, g, A, and τ are all experimentally determined or given coefficients, g=1 is usually set, and u(t) is a step function. According to a system function H(s) of the analog filter, the and matched Z-transform method is used to obtain the system function H(z) of the IIR digital filter. According to the expression of the system function H(z)

$$H(z) = \frac{B(z)}{A(z)} = \frac{b_0 + b_1 z^{-1} + b_2 z^{-2} + \ldots + b_N z^{-N}}{1 + a_1 z^{-1} + \ldots + a_M z^{-M}},$$

Coefficients $b_9, b_1, \ldots, b_N$ and $a_1, \ldots, a_M$ of the IIR digital filter can be obtained correspondingly. H(z) is the system function on the z domain describing the digital filter (the z-transform is required to solve the system function of the analog filter to digital filter). The system function completely represents the characteristics of a filter. z represents the z domain (polar coordinates of complex numbers). B(z) and A(z) respectively correspond to filter coefficients $b_i$ and $a_i$ to be used later.

Since the waveform calibration system currently involves only first-order IIR digital filters (multi-order IIR digital filters may be decomposed into a plurality of first-order IIR digital filters connected in series or parallel), the form of H(z) is usually as follows:

$$H(z) = \frac{B(z)}{A(z)} = \frac{b_0 + b_1 z^{-1}}{1 + a_1 z^{-1}};$$

a transfer function corresponding to the step response $$y(t) = \left(1 + Ae^{-\frac{t}{\tau}}\right) u(t)$$

is:

$$H(s) = \frac{1 + (A+1)s\tau}{1 + s\tau},$$

where

H(s) refers to the system function of the analog filter. s represents the s domain or s plane (x, y coordinates represent real and imaginary parts). During conversion from the analog filter to the digital filter, conversion from the s plane to the z plane (that is, z transform: $z = e^{sT}$, where T is the period of the sampling signal (the reciprocal of the sampling frequency)) is required, so that the system function also changes from H(s) to H(z).

Therefore, to calibrate H(s), a form of an additional transfer function needs to meet:

$$H(s) = \frac{1 + s\tau}{1 + (A+1)s\tau}.$$

The transfer function is implemented by using the IIR digital filter, which may be designed by using the matched Z-transform method. This method keeps the pole and the zero unchanged. The pole is $s = -1/(A+1)\tau$, and the zero is $S = -1/\tau$. Therefore, the system function H(z) of the IIR digital filter is:

$$H(z) = k_d \frac{1 - e^{-\frac{1}{\tau f_s}} z^{-1}}{1 - e^{-\frac{1}{(A+1)\tau f_s}} z^{-1}},$$

where $k_d$ is a coefficient, $f_s$ is a sampling frequency, and e is a natural constant. H(z=0)=1 is set, and a specific result of $k_d$ is obtained. Therefore, the coefficients of the IIR digital filter designed according to the matched Z-transform method are:

$$b_0 = k_d,$$

$$b_1 = -k_d p_1,$$

$$a_1 = -p_2,$$

where $$p_1 = e^{-\frac{1}{\tau f_s}},$$

$$p_2 = e^{-\frac{1}{(A+1)\tau f_s}},$$

$$k_d = (1 - p_2)/(1 - p_1),$$

the form of the corresponding IIR digital filter is:

$$y[n] = b_0 x[n] + b_1 x[n-1] - a_1 y[n-1]$$

The foregoing equation is transformed from the direct form 1 of the IIR digital filter to the canonical form:

$$y[n] = \alpha x[n] + \beta u[n], \text{ where}$$

$u[n] = \gamma x[n] + \delta u[n-1]$, y[n] represents an output signal of an $n^{th}$ sampling point, x[n] represents an input signal of the $n^{th}$ sampling point, u[n] represents a state value of the $n^{th}$ sampling point, n is a positive integer, and $\alpha$, $\beta$, $\gamma$, and $\delta$ are computable coefficients.

$\alpha$, $\beta$, $\gamma$, and $\delta$ may be obtained through calculation according to $b_0$, $b_1$, and $a_1$. Specifically, $$\alpha = \frac{b_1}{a_1}, \beta\gamma = b_0 - b_1/a_1,$$

and $\delta = -a_1$. For convenience, $\beta = 1$, and $\gamma = b_0 - b_1/a_1$.

The most important property of the canonical form is to extract the recursive part u[n] of y[n], and u[n] is the state value of the IIR digital filter, so that only the average of u[n] needs to be approximated during approximation, to minimize the deviation caused by approximating the input signal x[n]. This is because if the average of x[n] is directly approximated, there is a large approximate deviation. Taking the average of every 10 sampling points of x[n] as an example, $$\bar{x} = \frac{x[n] + x[n+1] + \ldots + x[n+9]}{10},$$

where the deviation is $$\sum_{i=0}^{9} x[n+i] - \bar{x}.$$

The input signal x[n] may jump, such as a step signal, which may have a large direct impact (deviation) on the output signal y[n] However, if the average of u[n] is approximated, since the coefficient $\beta$ is usually small in practice, the impact (deviation) on the output signal y[n] is controllable, avoiding the huge deviation caused by the jump of the input signal x[n].

For example, 20 sampling points (or referred to as data points) are calculated simultaneously when calculating the output signal for each beat. Assuming that the data points to be calculated for the current beat are y[n], y[n+1], . . . , y[n+19], y[n], y[n+1], . . . , y[n+19] can be calculated when u[n−1] and x[n], x[n+1], . . . , x[n+19] are known. Since it is difficult to maintain each u[n] in real time (that is, u[n] is updated for each sampling point), the average $\bar{u}$ of u[n−10], u[n−9], . . . , u[n−1] is used rather than u[n−1] during calculation of y[n], y[n+1], . . . , y[n+9] In this way, only an average of the latest 10 pieces of data of u needs to be maintained for each shot. Since the average calculation of u[n] is performed every 10 points, the span of two adjacent u[n] is 10 times the original, and it may be approximately considered that the sampling rate becomes one tenth of the original. That is, $f_s'=f_s/10$ is required when calculating H(z) according to H(s).

Assuming the average $\bar{u}$ of u[n−10], u[n−9], . . . , u[n−1] is obtained at present, and the input signal of the current beat is x[n], x[n+1], . . . , x[n+19] what needs to solve is: the average $\bar{u}'$ of the 20 data points y[n], y[n+1], . . . , y[n+19] and u[n+10], u[n+11], . . . , u[n+19]. The corresponding derivation is as follows:

when $$u_1 = \frac{u[n] + u[n+1] + \ldots + u[n+9]}{10},$$

and $$u_2 = \frac{u[n+10] + u[n+11] + \ldots + u[n+19]}{10}\bar{u}' = u_2;$$

and $$u_1 = \frac{\gamma(x[n] + x[n+1] + \ldots + x[n+9]) + 10\delta\bar{u}}{10};$$

$$u_2 = \frac{\gamma(x[n+10] + x[n+11] + \ldots + x[n+19]) + 10\delta u_1}{10};$$

for $0 \leq i \leq 9$.

$y[n+i]=\alpha x[n+i]+\beta u_1$; and $y[n+i+10]=\alpha x[n+i+10]+\beta u_2$.

To meet the main frequency of 100 MHz, the three-stage pipeline method is used: an intermediate result of x[n]+x[n+1]+ . . . +x[n+9] and x[n+10]+x[n+11]+ . . . +x[n+19] is calculated in the first beat of the pipeline, $u_1$ and $u_2$ are calculated in the second beat, and y[n], y[n+1], . . . , y[n+19] is calculated in the third beat. In fact, for the smooth operation of the entire pipeline, some intermediate results need to be stored in registers. An exemplary schematic diagram of the entire pipeline implementation is shown in FIG. 2. In the first beat, a sum corresponding to x[n]+x[n+1]+ . . . +x[n+9] and a sum corresponding to x[n+10]+x[n+11]+ . . . +x[n+19] are calculated simultaneously. In the second beat, based on the sums obtained in the first beat, a corresponding average of x[n]+x[n+1]+ . . . +x[n+9] and a corresponding average of x[n+10]+x[n+11]+ . . . +x[n+19] are calculated. Weighted addition is then performed on the corresponding average of x[n]+x[n+1]+ . . . +x[n+9] and $\bar{u}$ to obtain $u_1$. Weighted addition is then performed on the corresponding average of x[n+10]+x[n+11]+ . . . +x[n+19] and $u_1$ to obtain $u_2$. In the third beat, weighted addition is performed on x[n]+x[n+1]+ . . . +x[n+9] and $u_1$, and weighted addition is performed on x[n+10]+x[n+11]+ . . . +x[n+19] and $u_2$, to obtain y[n], y[n+1], . . . , y[n+19].

In addition, if the average of u[n] is obtained every five data points, the results of the IIR digital filter are more accurate than obtaining the average every ten data points. Correspondingly, y[n], y[n+1], . . . , y[n+19] needs to be divided into four sections for calculation: y[n], . . . , y[n+4] y[n+5], . . . , y[n+9] y[n+10], . . . , y[n+14], and y[n+15], . . . , y[n+19]. $u_1$, $u_2$, $u_3$, and $u_4$ are maintained in each beat, where each $u_i$ ($1 \leq i \leq 4$) represents the average of five data points. The calculation of $u_1$, $u_2$, $u_3$, and $u_4$ may be analogous to the calculation method of $u_1$ and $u_2$ above, and this expansion method may be referred to as time-domain crossover. In addition, the sampling rate is reduced by a factor of 5 when calculating H(z) according to H(s), that is, $f_s''=f_s/5$.

In some embodiments, fixed-point arithmetic is used in the whole process. The advantage of fixed-point numbers is that the precision bit width is high and the operation is stable, but the numerical representation range is limited. Each first-order IIR digital filter has a three-beat delay (30 ns). For L first-order IIR digital filters, the total delay is 30L ns if the series connection manner is used. However, if the parallel connection manner is used, the total delay is still 30 ns (not taking into account the additional one-beat delay of the input data).

In addition, since the current FPGA resources support appropriate expansion of the bit width of the intermediate data, the use of floating-point numbers can also achieve data precision comparable to that of fixed-point numbers (as long as the mantissa bit width is close to the fixed-point number bit width). The numerical representation range of floating-point numbers is much larger than that of fixed-point numbers, which has incomparable flexibility with fixed-point numbers, and may be more suitable for various experimental environments in the future. However, since no method is found to directly use floating-point number-related IP cores in the filter, floating-point number operations may require independent programming to realize floating-point number representation and operation functions.

The waveform calibration system provided in this application is implemented on Intel Stratix-10 FPGA through Verilog HDL. Each FPGA has a total of eight channels, and each channel has four first-order IIR digital filters. Through experimental calculation, the logic element consumption of a single channel is only about 2% of the total logic elements of the FPGA. Therefore, the resource consumption is relatively low: The logic elements are the basic resource unit of the FPGA, which are used to realize the basic operation logic such as multiplication, addition, and multiplexer. When hardware programming is synthesized, electronic design automation (EDA) software gives the consumption of "logic elements". Generally, a system is relatively safe as long as the system does not exceed 80% of the total logic on the FPGA chip. one channel accounts for 2%, and eight channels account for about 16% in total.

Figures 3, 4:
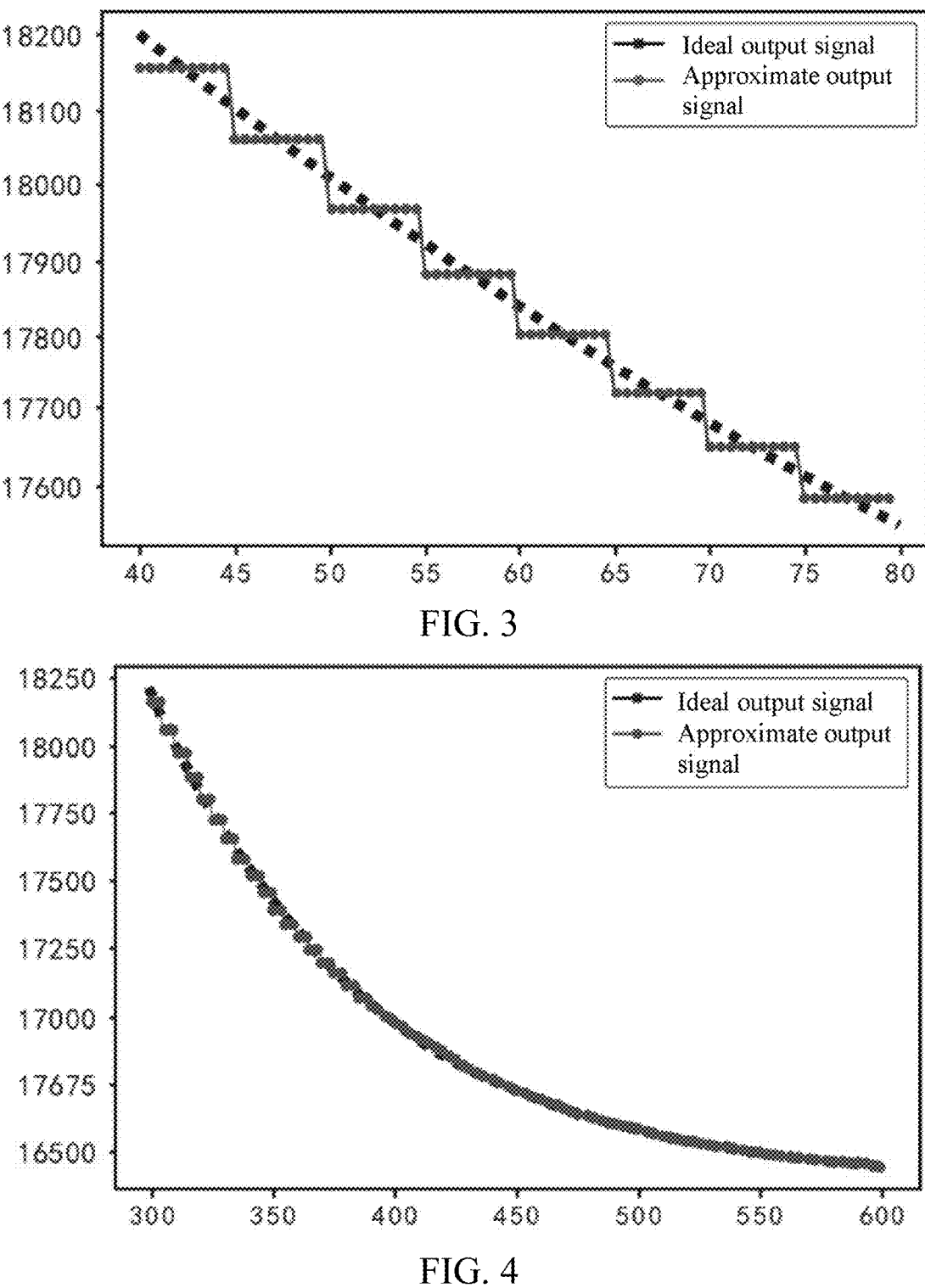
FIG. 3 is a schematic exemplary diagram of local representation of data when an IIR digital filter performs a simulation experiment.
FIG. 4 is a schematic exemplary diagram of global representation of data when an IIR digital filter performs a simulation experiment.

Through the simulation experiment of IIR digital filter on Python (a computer programming language) and the real physical experiment on the electronic system+oscilloscope, it is found that the results can reach 99.9% accuracy. FIG. 3 shows local representation of data when an IIR digital filter performs a simulation experiment on Python. FIG. 4 shows global representation of the experiment data. In FIG. 3 and FIG. 4, a light line is a simulated approximate output signal (a result expected to appear in the oscilloscope), a dark line is an ideal output signal (a result accurately calculated without approximation), the abscissa represents a quantity of sampling points, and the ordinate represents a value of the waveform at each sampling point in the simulation experiment. This experiment shows that a deviation between the approximate output signal and the ideal output signal is about less than one thousandth, about $\leq 5/18000$.

Figure 5:
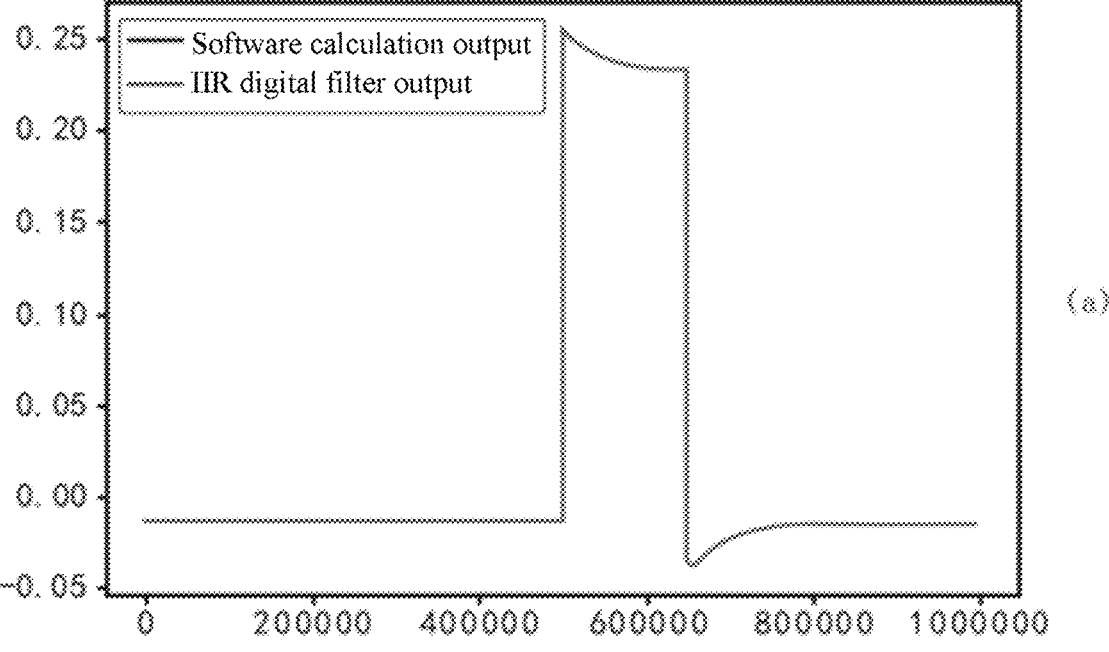
FIG. 5 is a schematic exemplary diagram of experimental results of an IIR digital filter on a real electronic system.
Figure 5:
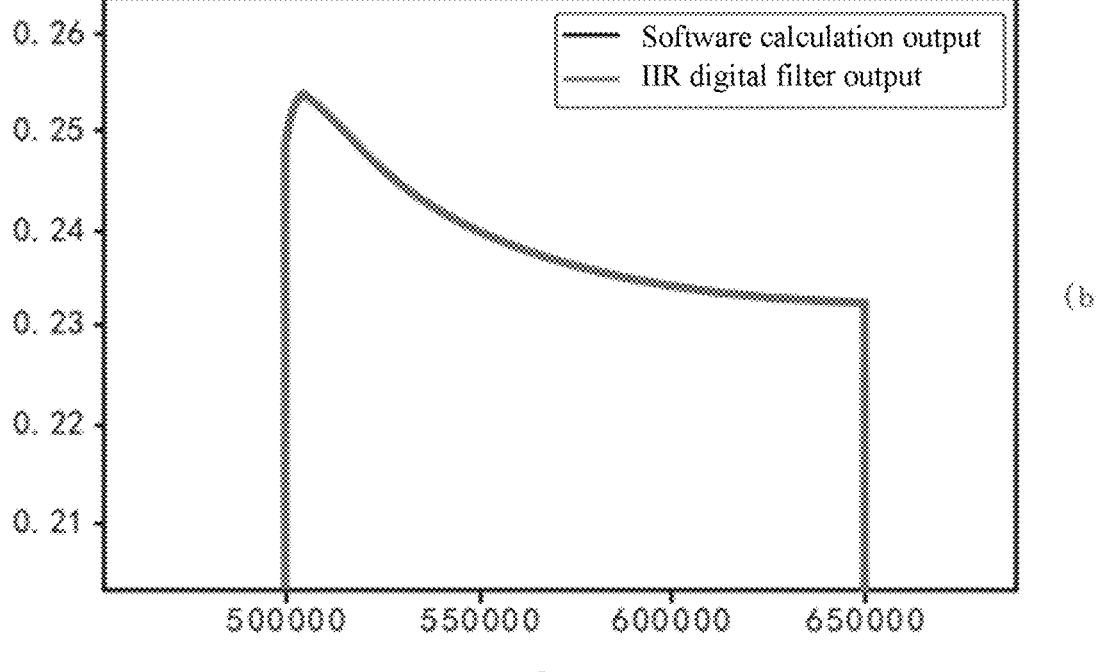

In addition, experimental results on a real electronic system are further provided: During calibration of a square wave, a calibrated result is first calculated through software, and the result is directly uploaded to hardware for output. In addition, the square wave is uploaded to the hardware and calibrated by using a designed IIR digital filter, and a result is outputted. The waveform output data acquired by the oscilloscope in two cases are shown in FIG. 5 below; where part (a) in FIG. 5 is a schematic diagram of the global representation, and part (b) is a schematic diagram of the local representation. The light line represents the output of the IIR digital filter, and the dark line represents the output of the software calculation. Since the output of the IIR digital filter is very accurate and close to the ideal output signal (that is, the output of the software calculation), the two lines are basically coincident in the figure.

With this FPGA-based on-chip fast waveform calibration system, the signal distortion caused by various LRC devices on the qubit control line can be calibrated with high accuracy, thereby laying a good foundation for real-time feedback for superconducting quantum computing.

In addition, if the average of u[n] is obtained every five data points, the output results of the IIR digital filter are more accurate. FIG. 6 is a diagram of the experimental results when the average of u[n] is obtained every five data points. The light line is the simulated approximate output signal, the dark line is the ideal output signal, the abscissa represents a quantity of sampling points, and the ordinate represents a value of the waveform at each sampling point in the simulation experiment.

An exemplary embodiment of this application further provides a waveform calibration circuit, including at least one IIR digital filter, the IIR digital filter is configured to perform waveform calibration on an input signal to obtain an output signal, and the output signal is calculated according to the input signal and a state value. In some embodiments, the state value is updated every other group of sampling points, and each group of sampling points includes a plurality of sampling points.

In some embodiments, the IIR digital filter is configured to calculate, according to an average of input signals respectively corresponding to sampling points in an $i^{th}$ group of sampling points and a state value corresponding to an $(i-1)^{th}$ group of sampling points, a state value corresponding to the $i^{th}$ group of sampling points, i is a positive integer; and calculate, for each sampling point in the $i^{th}$ group of sampling points, an output signal corresponding to the sampling point according to an input signal corresponding to the sampling point and the state value corresponding to the $i^{th}$ group of sampling points.

In some embodiments, the IIR digital filter is implemented by using three stages of pipelines, as shown in FIG. 2, where a first-stage pipeline 201 is configured to perform preliminary processing on the input signals respectively corresponding to the sampling points in the $i^{th}$ group of sampling points; a second-stage pipeline 202 is configured to calculate the average of the input signals respectively corresponding to the sampling points in the $i^{th}$ group of sampling points according to a processing result of the first-stage pipeline 201, and calculate the state value corresponding to the $i^{th}$ group of sampling points according to the average of the input signals respectively corresponding to the sampling points in the $i^{th}$ group of sampling points and the state value corresponding to the $(i-1)^{th}$ group of sampling points; and a third-stage pipeline 203 is configured to calculate, for each sampling point in the $i^{th}$ group of sampling points, an output signal corresponding to the sampling point according to an input signal corresponding to the sampling point and the state value corresponding to the $i^{th}$ group of sampling points.

In some embodiments, each group of sampling points includes k sampling points, and k is an integer greater than 1.

In some embodiments, the waveform calibration circuit is an FPGA.

For descriptions of the waveform calibration circuit, reference may be made to the descriptions in the embodiments above, and details are not described herein. In addition, in the foregoing embodiment, the application of the waveform calibration circuit in the qubit control system is mainly used as an example to explain the implementation principle of the waveform calibration circuit. It is to be understood that the waveform calibration circuit is also applicable to any other application scenarios with waveform calibration requirements, which is not limited in this application.

The following are method embodiments of this application, and the method embodiments can be implemented by the system provided in this application. For details not disclosed in the method embodiments of this application, reference may be made to the system embodiments of this application.

Referring to FIG. 7, an exemplary embodiment of this application further provides a signal control method for quantum computing. The method is applicable to a signal control system for quantum computing, the signal control system including: a signal source, a waveform calibration circuit, a qubit control line, and a qubit module. For the descriptions of the system, reference may be made to the foregoing embodiments, and details are not described herein again. The method may include the following steps (701 to 704):

Step 701: Generate, by the signal source, an original control signal.

Step 702: Perform, by the waveform calibration circuit, waveform calibration on the original control signal by using at least one IIR digital filter on the waveform calibration circuit, to obtain a calibrated control signal.

Step 703: Guide, by the qubit control line, the calibrated control signal to the qubit module.

Step 704: Generate, by the qubit module, a qubit, the calibrated control signal acting on the qubit after passing through the qubit control line, to control the qubit.

In some embodiments, the IIR digital filter calculates an output signal of the IIR digital filter according to an input signal of the IIR digital filter and a state value of the IIR digital filter, where the state value of the IIR digital filter is updated every other group of sampling points, and each group of sampling points includes a plurality of sampling points.

In some embodiments, the IIR digital filter calculates, according to an average of input signals respectively corresponding to sampling points in an $i^{th}$ group of sampling points and a state value corresponding to an $(i-1)^{th}$ group of sampling points, a state value corresponding to the $i^{th}$ group of sampling points, i is a positive integer; and the IIR digital filter calculates, for each sampling point in the $i^{th}$ group of sampling points, an output signal corresponding to the sampling point according to an input signal corresponding to the sampling point and the state value corresponding to the $i^{th}$ group of sampling points.

In some embodiments, the IIR digital filter is implemented by using three stages of pipelines, where a first-stage pipeline is configured to perform preliminary processing on the input signals respectively corresponding to the sampling points in the $i^{th}$ group of sampling points by using the IIR digital filter: a second-stage pipeline is configured to calculate, by using the IIR digital filter, the average of the input signals respectively corresponding to the sampling points in the $i^{th}$ group of sampling points according to a processing result of the first-stage pipeline, and calculate the state value corresponding to the $i^{th}$ group of sampling points according to the average of the input signals respectively corresponding to the sampling points in the $i^{th}$ group of sampling points and the state value corresponding to the $(i-1)^{th}$ group of sampling points; and a third-stage pipeline is configured to calculate, for each sampling point in the $i^{th}$ group of sampling points by using the IIR digital filter, an output signal corresponding to the sampling point according to an input signal corresponding to the sampling point and the state value corresponding to the $i^{th}$ group of sampling points.

In some embodiments, each group of sampling points includes k sampling points, and k is an integer greater than 1.

In some embodiments, each group of sampling points includes five to ten sampling points.

In some embodiments, a canonical form of the IIR digital filter is:

$$y[n]=\alpha x[n]+\beta u[n], \text{ where}$$

$u[n]=\gamma x[n]+\delta u[n-1]$, $y[n]$ represents an output signal of an $n^{th}$ sampling point, $x[n]$ represents an input signal of the $n^{th}$ sampling point, $u[n]$ represents a state value of the $n^{th}$ sampling point, n is a positive integer, and $\alpha$, $\beta$, $\gamma$, and $\delta$ are computable coefficients.

In some embodiments, a direct form 1 of the IIR digital filter is:

$$y[n]=b_0 x[n]+b_1 x[n-1]-a_1 y[n-1], \text{ where}$$

$$b_0 = k_d, \; b_1 = -k_d p_1, \; a_1 = -p_2, \; p_1 = e^{-\frac{1}{\tau f_s}},$$

$$p_2 = e^{\frac{1}{(A+1)\tau f_s}}, \; k_d = (1-p_2)/(1-p_1),$$

e is a natural constant, $f_s$ is a sampling frequency, and $\tau$ is a set coefficient; and when the direct form 1 is converted into the form of the canonical form, $$\alpha = \frac{b_1}{a_1}, \; \beta\gamma = b_0 - b_1/a_1,$$

and $\delta=-a_1$.

In some embodiments, a system function H(z) of the IIR digital filter is:

$$H(z) = k_d \frac{1 - e^{-\frac{1}{\tau f_s}} z^{-1}}{1 - e^{-\frac{1}{(A+1)\tau f_s}} z^{-1}},$$

where the system function H(z) is obtained by converting a system function H(s) of an analog filter using a matched Z-transform method, $$H(s) = \frac{1 + s\tau}{1 + (A+1)s\tau},$$

represents an s domain, z represents a z domain, and A is a set coefficient.

In some embodiments, the waveform calibration circuit is an FPGA.

In some embodiments, the FPGA has eight channels, and each of the channels includes up to four IIR digital filters.

Based on the above, according to the technical solutions provided in the embodiments of this application, through the IIR digital filter on the waveform calibration circuit, the control signal of the qubit is pre-compensated and calibrated, so that after the calibrated control signal passes through the qubit control line, the final control signal acting on the qubit is accurate and in line with the expected control signal, to implement precise control of the qubit. In addition, in this application, waveform calibration is performed on the control signal by the IIR digital filter on the hardware circuit, that is, the waveform calibration circuit. Compared with the waveform calibration implemented by the host computer, the communication delay brought by the operations such as process invocation of the host computer and data transmission can be avoided, thereby reducing the time required for waveform calibration and meeting the application requirements of low delay.

The embodiments of this application further provide a non-transitory computer-readable storage medium, storing at least one instruction, at least one program, a code set, or an instruction set, the at least one instruction, the at least one program, the code set, or the instruction set is loaded and executed by a processor to implement the signal control method for quantum computing provided in the foregoing method embodiments.

In some embodiments, the computer-readable storage medium may include: a read-only memory (ROM), a RAM, a solid state drive (SSD), an optical disc, or the like. The RAM may include a resistance random access memory (ReRAM) and a dynamic random access memory (DRAM).

The embodiments of this application further provide a computer program product, including at least one instruction, at least one program, a code set, or an instruction set, the at least one instruction, the at least one program, the code set, or the instruction set is loaded and executed by a processor to implement the signal control method for quantum computing provided in the foregoing method embodiments.

In some embodiments, the foregoing computer program product (or the at least one instruction, the at least one program, the code set, or the instruction set) may be executed by a computer device. For example, the computer device may be a classic computer such as a PC. The computer device executes the computer program product to control each physical hardware (for example, a signal source, a waveform calibration circuit, a qubit control line, and a qubit module) in the signal control system for quantum computing, to implement the foregoing signal control method for quantum computing.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the pre-defined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs signal generation and/or waveform calibration. In practical application, the foregoing functions may be allocated to and completed by different functional modules according to requirements, that is, an inner structure of a device is divided into different functional modules to implement all or a part of the functions described above.

What is claimed is:

1. A signal control system for quantum computing, comprising:

a signal source;

a waveform calibration circuit;

a qubit control line; and a qubit module, wherein:

the signal source is configured to generate an original control signal;

the waveform calibration circuit includes at least one infinite impulse response (IIR) digital filter, the IIR digital filter configured to perform waveform calibration on the original control signal to obtain a calibrated control signal, wherein:

the IIR digital filter is configured to calculate an output signal of the IIR digital filter according to an input signal of the IIR digital filter and a state value of the IIR digital filter; and the state value of the IIR digital filter is updated each time a group of sampling points is sampled from the input signal, each group of sampling points comprises a plurality of sampling points, the state value of the IIR digital filter is identical for all sampling points in each group, and in the output signal of the IIR digital filter, values for all sampling points in each group are simultaneously computed within a same beat;

the qubit control line is configured to guide the calibrated control signal to the qubit module;

the qubit module is configured to generate a qubit; and the calibrated control signal acts on the qubit after passing through the qubit control line, so as to control the qubit.

2. The signal control system according to claim 1, wherein the IIR digital filter is configured to:

calculate, according to an average of input signals corresponding to sampling points in an $i^{th}$ group of sampling points and a state value corresponding to an $(i-1)^{th}$ group of sampling points, a state value corresponding to the $i^{th}$ group of sampling points, wherein i is a positive integer.

3. The signal control system according to claim 2, wherein the IIR digital filter is further configured to:

calculate, for each sampling point in the $i^{th}$ group of sampling points, an output signal corresponding to the sampling point according to an input signal corresponding to the sampling point and the state value corresponding to the $i^{th}$ group of sampling points.

4. The signal control system according to claim 3, wherein the IIR digital filter includes a first-stage pipeline, wherein the first-stage pipeline is configured to perform preliminary processing on the input signals respectively corresponding to the sampling points in the $i^{th}$ group of sampling points.

5. The signal control system according to claim 4, wherein the IIR digital filter further includes a second-stage pipeline, wherein the second-stage pipeline is configured to calculate the average of the input signals respectively corresponding to the sampling points in the $i^{th}$ group of sampling points according to a processing result of the first-stage pipeline, and calculate the state value corresponding to the $i^{th}$ group of sampling points according to the average of the input signals respectively corresponding to the sampling points in the $i^{th}$ group of sampling points and the state value corresponding to the $(i-1)^{th}$ group of sampling points.

6. The signal control system according to claim 5, wherein the IIR digital filter further includes a third-stage pipeline, wherein the third-stage pipeline is configured to calculate, for each sampling point in the $i^{th}$ group of sampling points, an output signal corresponding to the sampling point according to an input signal corresponding to the sampling point and the state value corresponding to the $i^{th}$ group of sampling points.

7. The signal control system according to claim 1, wherein each group of sampling points comprises k sampling points, and k is an integer greater than 1.

8. The signal control system according to claim 1, wherein each group of sampling points comprises five to ten sampling points.

9. The signal control system according to claim 1, wherein the waveform calibration circuit is a field programmable gate array (FPGA).

10. The signal control system according to claim 9, wherein the FPGA has eight channels, and each of the channels comprises up to four IIR digital filters.

11. A signal control method for quantum computing, performed by a signal control system having a signal source, a waveform calibration circuit, a qubit control line, and a qubit module, the method comprising:

generating, by the signal source, an original control signal;

performing, by the waveform calibration circuit using at least one infinite impulse response (IIR) digital filter on the waveform calibration circuit, waveform calibration on the original control signal to obtain a calibrated control signal, including calculating, by the IIR digital filter, an output signal of the IIR digital filter according to an input signal of the IIR digital filter and a state value of the IIR digital filter; wherein:

the state value of the IIR digital filter is updated each time a group of sampling points is sampled from the input signal, each group of sampling points comprises a plurality of sampling points, the state value of the IIR digital filter is identical for all sampling points in each group, and in the output signal of the IIR digital filter, values for all sampling points in each group are simultaneously computed within a same beat; and guiding, by the qubit control line, the calibrated control signal to the qubit module; and generating, by the qubit module, a qubit, the calibrated control signal acting on the qubit after passing through the qubit control line, to control the qubit.

12. The method according to claim 11, further comprising:

calculating, by the IIR digital filter according to an average of input signals corresponding to sampling points in an $i^{th}$ group of sampling points and a state value corresponding to an $(i-1)^{th}$ group of sampling points, a state value corresponding to the $i^{th}$ group of sampling points, wherein i is a positive integer; and calculating, by the IIR digital filter for each sampling point in the $i^{th}$ group of sampling points, an output signal corresponding to the sampling point according to an input signal corresponding to the sampling point and the state value corresponding to the $i^{th}$ group of sampling points.

13. The method according to claim 12, wherein the IIR digital filter includes a first-stage pipeline, wherein the first-stage pipeline is configured to perform preliminary processing on the input signals respectively corresponding to the sampling points in the $i^{th}$ group of sampling points.

14. The method according to claim 13, wherein the IIR digital filter further includes a second-stage pipeline, wherein the second-stage pipeline is configured to calculate the average of the input signals respectively corresponding to the sampling points in the $i^{th}$ group of sampling points according to a processing result of the first-stage pipeline, and calculate the state value corresponding to the $i^{th}$ group of sampling points according to the average of the input signals respectively corresponding to the sampling points in the $i^{th}$ group of sampling points and the state value corresponding to the $(i-1)^{th}$ group of sampling points.

15. The method according to claim 14, wherein the IIR digital filter further includes a third-stage pipeline, wherein the third-stage pipeline is configured to calculate, for each sampling point in the $i^{th}$ group of sampling points, an output signal corresponding to the sampling point according to an input signal corresponding to the sampling point and the state value corresponding to the $i^{th}$ group of sampling points.

16. A non-transitory computer-readable storage medium storing one or more instructions that, when executed by a signal control system having a signal source, a waveform calibration circuit, a qubit control line, and a qubit module, cause the signal control system to perform operations comprising:

generating, by the signal source, an original control signal;

performing, by the waveform calibration circuit using at least one infinite impulse response (IIR) digital filter on the waveform calibration circuit, waveform calibration on the original control signal to obtain a calibrated control signal, including calculating, by the IIR digital filter, an output signal of the IIR digital filter according to an input signal of the IIR digital filter and a state value of the IIR digital filter; wherein:

the state value of the IIR digital filter is updated each time a group of sampling points is sampled from the input signal, each group of sampling points comprises a plurality of sampling points, the state value of the IIR digital filter is identical for all sampling points in each group, and in the output signal of the IIR digital filter, values for all sampling points in each group are simultaneously computed within a same beat;

guiding, by the qubit control line, the calibrated control signal to the qubit module; and generating, by the qubit module, a qubit, the calibrated control signal acting on the qubit after passing through the qubit control line, to control the qubit.

17. The non-transitory computer-readable storage medium according to claim 16, the operations further comprising:

calculating, by the IIR digital filter according to an average of input signals corresponding to sampling points in an $i^{th}$ group of sampling points and a state value corresponding to an $(i-1)^{th}$ group of sampling points, a state value corresponding to the $i^{th}$ group of sampling points, wherein i is a positive integer; and calculating, by the IIR digital filter for each sampling point in the $i^{th}$ group of sampling points, an output signal corresponding to the sampling point according to an input signal corresponding to the sampling point and the state value corresponding to the $i^{th}$ group of sampling points.

* * * * *